United States Patent [19]

Traa

[11] Patent Number: 4,991,119
[45] Date of Patent: Feb. 5, 1991

[54] PICTURE DISPLAY DEVICE INCLUDING A WAVEFORM GENERATOR

[75] Inventor: Willebrordus G. Traa, Eindhoven, Netherlands

[73] Assignee: U.S. Philips Corporation, New York, N.Y.

[21] Appl. No.: 290,410

[22] Filed: Dec. 27, 1988

[30] Foreign Application Priority Data

Jan. 7, 1988 [NL] Netherlands .......................... 8800023

[51] Int. Cl.[5] .......................... G09G 1/10; H04N 3/22
[52] U.S. Cl. ...................................... 364/521; 358/10; 358/139
[58] Field of Search .................. 364/521, 518; 358/10, 358/139, 150, 159

[56] References Cited

U.S. PATENT DOCUMENTS

| | | | |
|---|---|---|---|
| 4,158,208 | 6/1979 | Dischert | 358/10 |
| 4,234,890 | 11/1980 | Astle et al. | 358/10 |
| 4,466,014 | 8/1984 | Wilensky et al. | 358/10 |
| 4,491,925 | 1/1985 | Richards | 364/521 |
| 4,608,593 | 8/1986 | Miyaji et al. | 358/10 |
| 4,670,782 | 6/1987 | Harshbarger et al. | 358/139 |
| 4,754,334 | 6/1988 | Kriz et al. | 358/244 |

OTHER PUBLICATIONS

"Digit 2000, VLSI Digital TV System", Rombach Druckhaus KG (Freiburg, DE), 1985, Chapter DPU 2500, Deflection Processing Unit, pp. 111-134.

Primary Examiner—Dale M. Shaw
Assistant Examiner—Raymond J. Bayerl
Attorney, Agent, or Firm—Edward W. Goodman

[57] ABSTRACT

A picture display device including a waveform generator for generating a periodical waveform for addressing picture elements of a display screen, which waveform is changeable by means of a plurality of adjusting parameters. For adjusting the desired waveform, the picture display device is adapted to perform the following technical steps:
rendering a first parameter zero;
determining the other parameters for obtaining the desired waveform at given locations on the display screen;
based on the previous steps, establishing a relationship between the other parameters and the first parameter;
determining the first parameter for obtaining the desired waveform at other locations on the display screen; and
storing the relationship and the adjusted values of the parameters.

5 Claims, 1 Drawing Sheet

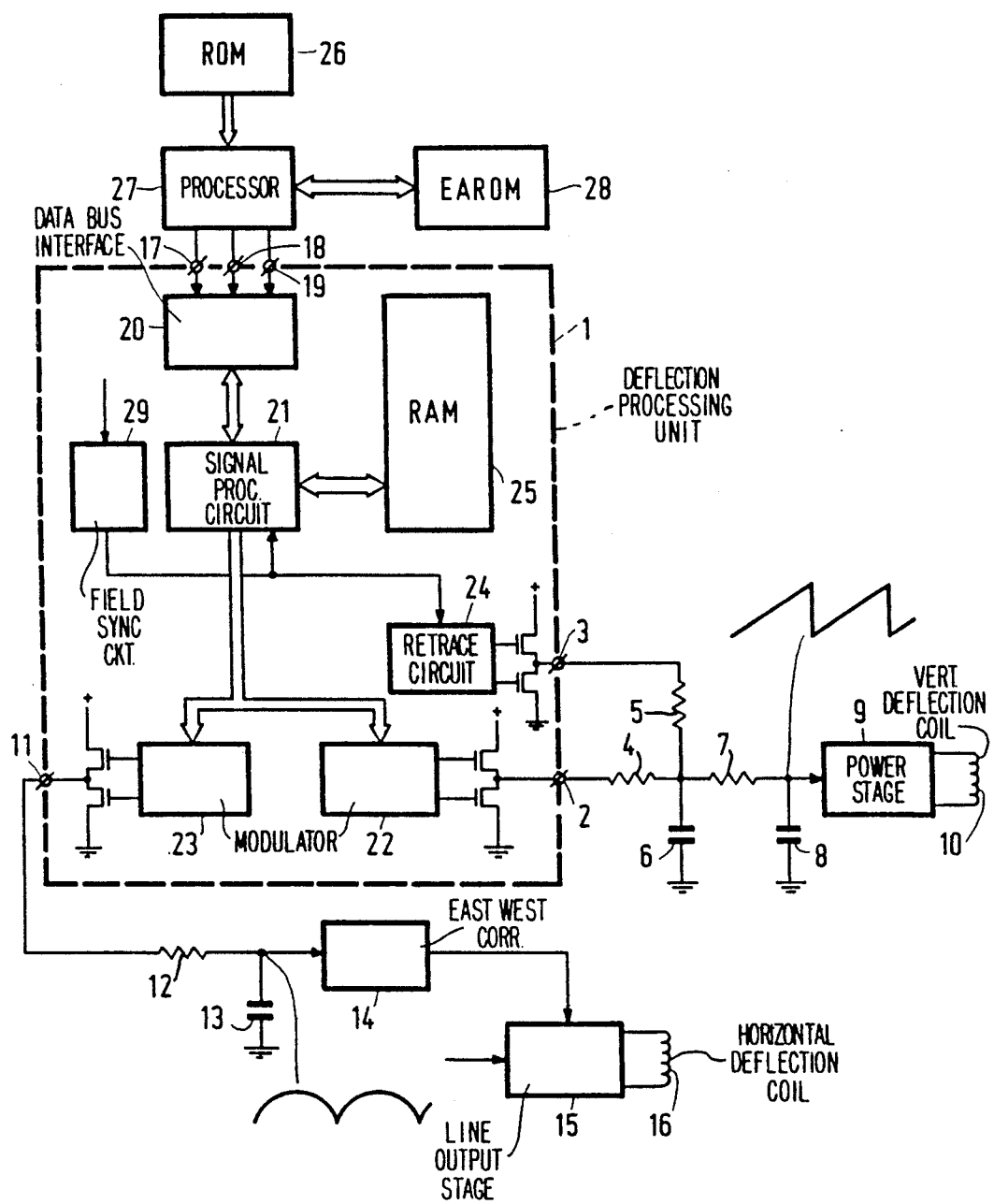

PICTURE DISPLAY DEVICE INCLUDING A WAVEFORM GENERATOR

BACKGROUND OF THE INVENTION

1. Field of the Invention

The invention relates to a picture display device including a waveform generator for generating a periodical waveform for addressing picture elements of a display screen, said waveform being changeable by means of a plurality of adjusting parameters.

2. Description of Related Art

Such a waveform is useful for addressing picture elements of the display screen, for example, for addressing luminescing picture elements or for deflecting one or more electron beams in a picture display tube, either at the field frequency or at the line frequency. Field frequency waveforms are, for example, a sawtooth-shaped voltage for the field deflection, i.e. the deflection in the vertical direction, and a usually parabolic signal for the so-called east-west (raster) correction of the line deflection, i.e. the deflection in the horizontal direction. Other field frequency waveforms for correcting the deflection may be required for convergence or for dynamic focusing. Similarly, line frequency waveforms are generated for line deflection, convergence and focusing. For generating the various waveforms, the waveform generator receives a trigger signal which usually originates from a synchronizing circuit and which is substantially synchronous with a synchronizing signal present in an incoming video signal. As a result, the generated waveforms have the correct field or line frequency and substantially the same phase as the synchronizing signal. Circuit arrangements with which these signal processing operations can be performed are known. Such a circuit arrangement is described in, for example, "DIGIT 2000, VLSI Digital TV System" 1985, Rombach Druckhaus KG (Freiburg, DE), Chapter "DPU 2500, Deflection Processing Unit", pp. 111-134.

In this arrangement, each waveform to be generated depends on a plurality of parameters which must be adjusted. For example, for the sawtooth shape for the field deflection, there are usually four adjustable parameters, namely the DC component of the sawtooth shape, which determines the vertical position of the displayed picture on the display screen of the display tube, the amplitude, the symmetry with respect to the central horizontal line on the screen and the linearity correction. The relevant adjustments are not independent of one another. If, for example, the linearity is adjusted, it appears that the vertical position and the amplitude also change and that the displayed picture becomes asymmetrical with respect to the imaginary central horizontal line on the display screen. Similar problems occur when adjusting the other waveforms. If one of the parameters is adjusted, it should be repeatedly attempted to find new values for the other parameters until all parameters have a more or less correct value. Adjusting the parameters is therefore quite time-consuming.

SUMMARY OF THE INVENTION

It is an object of the invention to provide a picture display device of the type described above in which the parameters can be adjusted separately without the properties dependent on the other parameters being affected. To this end the picture display device according to the invention is characterized in that for adjusting the desired waveform, the picture display device is adapted to perform the following technical steps:
rendering a first parameter zero;
determining the other parameters for obtaining the desired waveform at given locations on the display screen;
based on the previous steps, establishing a relationship between the other parameters and the first parameter;
determining the first parameter for obtaining the desired waveform at other locations on the display screen; and
storing the relationship and the adjusted values of the parameters.

Due to the stored relationship between the first and the other parameters, each variation of the first parameter results in the other parameters varying in a corresponding manner, but the adjustment of the first parameter does not have any influence on the other waveform properties which have already been adjusted.

The picture display device is advantageously characterized in that it is provided with storage means for storing the values found upon determining the parameters and for storing the relationship between the other parameters and the first parameter, and in that it also includes a processor coupled to the storage means and the waveform generator for computing new values of the other parameters as a function of the first parameter and for applying the new values of the parameters to the waveform generator. Modern picture display devices already include such storage means and such a processor, which thus find a novel application.

In one embodiment, the picture display device according to the invention for adjusting a field frequency sawtooth-shaped waveform for the field deflection of the displayed picture is adapted to perform the following technical steps:
rendering one or more parameters zero for adjusting the vertical linearity correction;
determining the other parameters for giving the central horizontal line and the first or the last horizontal line the desired location on the display screen;
based on the previous steps, computing the relationship between the other parameters and the linearity correction parameter(s);
determining the linearity correction parameter(s) for obtaining the desired vertical linearity correction on the display screen, and
storing the relationship and the adjusted values of the parameters.

BRIEF DESCRIPTION OF THE DRAWING

The invention will now be described in greater detail, by way of example, with reference to the accompanying drawing whose sole FIGURE shows the part of a picture display device, for example, a television receiver, which part is relevant to the invention.

DESCRIPTION OF THE PREFERRED EMBODIMENT

In the FIGURE the reference numeral 1 denotes a deflection processing unit of known type in a picture display device for generating a field frequency sawtooth-shaped signal for the field deflection and for generating a field frequency parabolic correction signal for the line deflection. The signal which is present at an output 2 of unit 1, which is, for example, of the type DPU2543 of the firm of Intermetall, comprises a series of pulse-duration modulated pulses having the same repetition frequency as clock pulses, which are active in unit 1, and having a field frequency periodicity. A resistor 4 is connected to output 2 and a resistor 5 is connected to an output 3. The other terminals of resistors 4 and 5 are interconnected and connected to a terminal of a capacitor 6. The other terminal of capacitor 6 is connected to ground. A charge current, for charging capacitor 6 from a given initial value of the voltage across it, flows through resistor 4 to this capacitor and a discharge current, for discharging the capacitor to the initial value, flows through resistor 5 at the end of the field period. Elements 4 and 6 constitute a low-pass filter passing the DC component of the pulsatory voltage. The circuit comprises an additional low-pass filter including a resistor 7 and a capacitor 8 for obtaining a better integration than would be the case with a single filter cell. A field frequency sawtooth-shaped voltage is available across capacitor 8. As is known, a pulse-duration modulator and a low-pass filter connected thereto ensure a digital-to-analog conversion. The sawtooth-shaped voltage is converted in known manner by means of a power stage 9 into a sawtooth-shaped deflection current which flows through a field deflection coil 10 connected to stage 9 for the vertical deflection in a picture display tube (not shown).

A signal comprising a series of pulse-duration modulated pulses having the clock pulse frequency and a field frequency periodicity is present at an output 11 of unit 1. A resistor 12 is connected to output 11 and its other terminal is connected to a terminal of a capacitor 13. The other terminal of capacitor 13 is connected to ground. Similarly as described above, the pulse-duration modulator in unit 1 and the low-pass filter constituted by elements 12 and 13 form a digital-to-analog converter. A field frequency parabolic voltage which is applied to an east-west correction stage 14 is present across capacitor 13. Stage 14 is connected to a line output stage 15 which also receives a line frequency signal. Stages 14 and 15 ensure in known manner that a line frequency sawtooth-shaped line deflection current flows through a line deflection coil 16 connected to stage 15, this current having a field frequency parabolic amplitude modulation for the horizontal deflection in the picture display tube, the parabola shape reaching an extreme value in the middle of the field trace period.

Unit 1 has inputs which are connected to a data bus for passing on the data required for generating the above signals. A plurality of adjusting values is received via three of these inputs 17, 18 and 19 and via a data bus interface circuit 20. The adjusting values are converted into the pulse-duration modulated signals available at the outputs 2 and 11 by means of a signal processing circuit 21 which computes the waveforms and two modulators 22 and 23 connected thereto. Circuit 21 and a retrace circuit 24 receive a field trigger pulse which is generated in known manner by a field synchronizing circuit 29 and is substantially synchronous with a field synchronizing signal which is present in an incoming video signal. Circuit 24 is coupled to output 3 for each time resetting the voltage across capacitors 6 and 8. During each field period, circuit 21 uses the trigger pulse as a starting pulse and computes a series of 12 bit values for the sawtooth and parabola shapes. The computation clock pulse frequency is obtained by dividing a main clock frequency $f_o$ by $2^{10} = 1024$. Frequency $f_o$ is 17.734475 MHz for the PAL color television standard.

The computation clock frequency for circuit 21 is therefore 17.3188 kHz.

The adjusting parameters are stored in a random access memory (RAM) 25 for use by circuit 21 during each field period. These parameters are $A_o$, $H_o$, $S_o$ and $S_1$ for the sawtooth generation. For the clock pulse having the rank z, in which z is at least 1 and at most N, a value $Y_s$ is computed on the basis of the following summation formula:

$$Y_s = A_o + \qquad (1)$$

$$\sum_{z=1}^{N} \left( \frac{H_o}{2^{10}} - \left| \frac{S_1}{2^8} - \frac{S_o}{2^{18}} \cdot \text{Int}\left(\frac{z+1}{2}\right) \right| \right)$$

In this formula Int (=integer) indicates an integral number. z assumes the value m in the center of the part of the displayed picture visible on the display screen. It appears from formula (1) that $A_o$ corresponds to the value of the sawtooth shape at the start of the period. If $A_o$ varies, the vertical position of the picture displayed on the display screen of the display tube varies. $H_o$ corresponds to the variation between a clock pulse and the subsequent clock pulse. If $S_o$ and $S_1$ are zero, formula (1) reduces to:

$$Y_s(z) = A_o + z \frac{H_o}{2^{10}},$$

which is a linear function of z. Parameters $S_o$ and $S_1$ correspond to a linearity correction and particularly to the so-called S correction of the sawtooth shape. For a curve which is symmetrical with respect to the center, $S_o$ and $S_1$ depend on each other as follows:

$$S_1 = \frac{S_o}{2^{10}} \cdot \frac{m+1}{2}.$$

In the center, i.e. for z=m, the correction term is zero. It appears from formula (1) that the difference between the values of $Y_s$ for a given value of the variable z and the subsequent value of z is a triangular function of z, i.e. approximately a quadratic function, so that the term in formula (1) with the absolute value yields after summation a function which is approximately a third-degree function of z which is symmetrical with respect to the value z=m.

The obtained values of $Y_s$ are quantized by circuit 21 to 4 bit values and they are subsequently converted by modulator 22 into the pulse-duration modulated pulses for the analog sawtooth shape. Together with the external low-pass filter modulator 21 operates as a digital-to-analog converter having a conversion time which corresponds to a clock frequency of $f_o/16$. It is a requirement that the time constant of the filter must be many times longer than the period of the conversion time and must also be longer than the period of the computation clock frequency. For the PAL standard, in which the field period is 20 ms, the maximum value N of z is 346. The variation during the visible part of the sawtooth takes place between 32 and 336 for z, so that m=184.

Similarly the parabola shape is given by the following summation formula:

$$Y_p = 4Y_o + \sum_{z=1}^{N}\left(\frac{Z_o}{2^8} - \frac{P_o}{2^{18}} \text{Int}\left(\frac{z}{2}\right)\right) + \quad (2)$$

$$\sum_{z=2k_1}^{z=2k_2}\left(\frac{Z_1}{2^8} - \frac{P_1}{2^{18}} \text{Int}\left(\frac{z - 2k_1}{2}\right)\right)$$

with the adjusting parameters $Y_o$, $P_o$, $P_1$, $Z_o$, $Z_1$, $k_1$ and $k_2$.

Parameter $Y_o$ corresponds to the value of the parabola at the start of the period and thus determines the width of the displayed picture. The first summation term, in which the difference between the values of $Y_p$ between a given value of z and the subsequent value of z is a linear function of z, indicates a first parabola after summation with z varying between 1 and N. For a symmetrical curve it holds that:

$$Z_o = \frac{P_o}{2^{10}} \cdot \frac{m}{2}$$

The second summation term indicates a second parabola which is smaller in amplitude and in which z varies between $2k_1$ and $2k_2$. For a symmetrical curve it holds that:

$$Z_1 = \frac{P_1}{2^{10}} \cdot \frac{m - 2k_1}{2} \text{ and } k_1 + k_2 = m.$$

It is apparent therefrom that $Y_p$ is actually the combination of two parabola shapes. For some types of display tubes, the second parabola shape is required. $2k_1$ is, for example, equal to 60. Circuit 21 quantizes the obtained values of $Y_p$ to 4 bit values and subsequently they are converted by modulator 23 into the pulse duration-modulated pulses for the analog parabola shape. In the embodiment described, the values of resistors 4, 5, 7 and 12 are approximately 10 kΩ, 470 Ω, 3.9 kΩ and 10 kΩ, respectively, and the capacitances of capacitors 6, 8 and 13 are approximately 68, 15 and 220 nF, respectively.

It is apparent from the foregoing and particularly from the given arithmetical series that suitable values for obtaining the desired waveforms must be assigned to a plurality of independent adjusting parameters, which are $A_o$, $H_o$ and $S_o$ for the sawtooth and $Y_o$, $P_o$, $k_1$ and $P_1$ for the parabola in the case of symmetrical waveforms. The algorithms which are composed from the said series are, however, such that a variation of one of the parameters requires the other parameters to be adapted. If, for example, the sawtooth shape is adjusted for the desired S correction, i.e. if the parameter $S_o$ is adjusted to a given value, the phase and the amplitude also vary and the displayed picture becomes asymmetrical with respect to the central horizontal line on the display screen. This is apparent from formula (1) in which the vertical position (the phase) not only depends on $A_o$ but also on $S_o$ and $S_1$ and in which the amplitude not only depends on $H_o$ but also on $S_o$ and $S_1$. Similar problems occur when adjusting the east-west correction. Thus, adjusting the parameters is iterative and therefore quite time-consuming.

The adjusting parameters are obtained in a different manner by means of the circuit described, namely in the following manner. For the field sawtooth, the phase and the amplitude of the sawtooth are first adjusted by means of the parameters $A_o$ and $H_o$ in such a way that, while the parameters $S_o$ and $S_1$ for the S correction are zero, the central horizontal line of the displayed picture is located on the imaginary central horizontal line of the display screen and that the last horizontal line which one still wants to see on the displayed picture is just visible at the bottom of the display screen. When adjusting the S correction parameters $S_o$ and $S_1$, these two lines should always be located at these positions, while the symmetry must be maintained. This implies that a computation algorithm is found whose result remains constant for these two lines when the parameters are varied. Due to this constancy, an unambiguous relationship is established between $S_o$ and $S_1$, on the one hand, and the parameters $A_o$ and $H_o$ to be readjusted, on the other hand.

This relationship can be derived by assuming that $Y(z=m)$ must be constant for each value of $H_o$ and $A_o$, so that according to formula (1) in which $$S_o = S_1 = 0:$$

$$Y_s(z = 184) = A_1 + 184\frac{H_1}{2^{10}} = C_1$$

i.e. for the central line, and $$Y_s(z = 336) = A_1 + 336\frac{H_1}{2^{10}} = C_2.$$

i.e. for the last line in which $A_1$ and $H_1$ are the values of $A_o$ and $H_o$, respectively, obtained with the adjustment, that is to say, they are the values of $A_o$ and $H_o$ for $S_o=0$. $A_o$ and $H_o$ can now be computed with reference to the numbers $C_1$ and $C_2$ found. A computation program has been developed for this purpose. With the aid of this program $A_o$ and $H_o$ are determined as a function of $C_1$ and $C_2$, consequently of $A_1$ and $H_1$, and as a function of the parameters $S_o$ and $S_1$ (only $S_o$ in the case of a symmetrical curve). The result is given by the following formulas with the new values of $A_o$ and $H_o$:

$$H_o = H_1 + \frac{S_o}{2^{10}}(y - m) \quad (3)$$

$$A_o = A_1 + \frac{mS_o}{2^{20}}(2m - y) \quad (4)$$

In these formulas y is the highest value of z, in this example 336. The correctness of the computation program can be verified by computing the value of $Y_s$ for $z=32$, i.e. for the first horizontal line. Then it appears that this line, as was to be expected due to the symmetry with respect to the central horizontal line, does not change its position when varying $S_o$ and $S_1$. It will be clear that the computation program can also be developed by starting from $z=m$ and $z=32$.

The computation program is stored during manufacture in a read-only memory (ROM) 26. The values $A_1$ and $H_1$ found with the adjustment described are stored during adjustment in an electrically alterable read only memory (EAROM) 28. Subsequently, the S correction for the other horizontal lines is adjusted, which yields the values of the parameters $S_o$ and $S_1$, while the amplitude, the phase and the symmetry remain unchanged. The values of $S_o$ and $S_1$ are also stored in memory 28. A processor 27 coupled to memories 26 and 28 performs the computation program upon activation of the picture display device for supplying the parameters $A_o$, $H_o$, $S_o$ and $S_1$ to memory 28 whereafter memory 28 is read and the data are applied to memory 25 and circuit 21 via the suitable inputs of unit 1.

Similarly, a computation program is developed for the east-west parabola. For this purpose, the parameters $Z_o$, $P_o$, $Z_1$ and $P_1$ of formula (2) are first rendered equal to zero. With the aid of $Y_o$, the picture width is adjusted in such a way that the outermost lines which one still wants to see of a test pattern of horizontal and vertical lines coincide with the vertical edges of the display screen in the center of the screen. The peak of the parabola shape is fixed thereby. According to formula (2) this implies that $$Y_p(z=184)=4Y_1$$

in which $Y_1$ is the value of $Y_o$ obtained with the adjustment. A relationship between $Y_o$ and the other parameters is fixed thereby. Subsequently, the relevant parameters $Z_o$, $P_o$, $Z_1$ and $P_1$ are varied until the vertical lines of the test pattern are displayed as vertical straight lines, as desired. The two parabolas are entirely determined thereby. A computation program is developed for computing the parameter $Y_o$ as a function of the number $Y_1$ found and as a function of the four parameters $Z_o$, $P_o$, $Z_1$ and $P_1$. With the aid of this program a new value for $Y_o$ is computed each time upon adjusting these parameters, while the picture width in the center remains constant. Formulas which are similar to (3) and (4) are then found. The number $Y_1$ and the values found for the four parameters as well as the computation program are stored in memories 26 and 28 in the same manner as was the case for the sawtooth shape. Processor 27 performs the program for applying the parameters $Y_o$, $Z_o$, $P_o$, $Z_1$ and $P_1$ to the suitable inputs of unit 1 for memory 25 and circuit 21.

As a safeguard against possible disturbances, the data from memory 28 are applied periodically, for example, every second by processor 27 to unit 1 for refreshing the data in memory 25. It will be noted that the low-pass filters produce a phase shift of the generated waveforms. With the above-mentioned filters this shift corresponds to a time delay of approximately 0.88 ms, i.e. approximately 15 computation intervals of circuit 21. This is taken into account in the above-mentioned computations because all relevant values of z are decreased by 15. Thus m acquires the value 169 and the value of z for the last line is 321. It will be obvious that similar procedures as described above can be performed for generating waveforms given by mathematical formulas other than (1) and (2). It will be noted that other field frequency waveforms may be generated, if required, for example, sawtooth and parabola shapes for the dynamic focusing signals or for convergence. For this purpose different parameters must be determined and it will be clear that a computation program can also be developed for these waveforms. The circuit can also be used for generating line frequency waveforms, naturally on the condition that the required computations can be performed rapidly enough.

What is claimed is:

1. A picture display device including a waveform generator for generating a plurality of periodical waveforms for addressing picture elements of a display screen, said waveforms being given by summation formulas each containing a plurality of adjusting parameters, said picture display device for adjusting each desired waveform performing the following technical steps:

rendering a first parameter of the desired waveform zero;

determining the other parameters of the desired waveform for obtaining the desired waveform at given locations on the display screen;

based on the previous steps, computing a relationship between the other parameters and the first parameter of the desired waveform;

storing in storage means the values found upon determining the other parameters of the desired waveform, and the relationship between the other parameters and the first parameter of the desired waveform;

determining the first parameter for obtaining the desired waveform at other locations on the display screen; and determining and storing in the storage means adjusted values of the parameters of the desired waveform at the other locations, wherein the display device further comprises a processor coupled to the storage means and to the waveform generator for computing new values of the other parameters of the desired waveform upon activation of the picture display device with reference to a new value of the first parameter and the stored values of the parameters of the desired waveform and with reference to the stored relationship, and for applying the new values of the parameters to the waveform generator.

2. A picture display device as claimed in claim 1, wherein the storage means comprises a first memory for storing the values found upon determining the parameters of the desired waveform, and a second memory for storing said relationship between the other parameters and the first parameter of the desired waveform, the contents of the first memory being changeable and the contents of the second memory being not changeable.

3. A picture display device as claimed in claim 2, characterized in that in operation the processor periodically applies the data from the first memory to the waveform generator for refreshing the data required for generating the waveform.

4. A picture display device as claimed in claim 1, characterized in that for adjusting a field frequency sawtooth-shaped waveform for the field deflection of the displayed picture, the picture display device is adapted to perform the following technical steps:

rendering one or more parameters zero for adjusting the vertical linearity correction;

determining the other parameters for giving the central horizontal line and the first or the last horizontal line the desired location on the display screen;

based on the previous steps, computing the relationship between the other parameters and the linearity correction parameter(s);

determining the linearity correction parameter(s) for obtaining the desired vertical linearity correction on the display screen; and storing said relationship and the adjusted values of the parameters.

5. A picture display devise as claimed in claim 1, characterized in that for adjusting a field frequency parabola-shaped waveform for the field correction of the displayed picture, the picture display device is adapted to perform the following technical steps:

rendering all adjusting parameters zero, except for the parameter for adjusting the width of the displayed picture;

adjusting the picture width by means of said width adjusting parameter;

based on the previous steps, computing the relationship between the other parameter and width adjusting parameter;

determining the other parameters for obtaining the desired linearity correction on the display screen; and storing said relationship and the adjusted values of the parameters.

* * * * *